(12) United States Patent
Frerichs et al.

(10) Patent No.: US 8,887,498 B2
(45) Date of Patent: Nov. 18, 2014

(54) TRANSMISSION HYDRAULIC CONTROL SYSTEM HAVING AN ACCUMULATOR BYPASS VALVE ASSEMBLY

(75) Inventors: Todd A. Frerichs, Waterford, MI (US); Brian W. Whitmarsh, Commerce, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 282 days.

(21) Appl. No.: 12/944,274

(22) Filed: Nov. 11, 2010

(65) Prior Publication Data
US 2011/0146820 A1  Jun. 23, 2011

Related U.S. Application Data

(60) Provisional application No. 61/287,814, filed on Dec. 18, 2009.

(51) Int. Cl.
| F16D 31/02 | (2006.01) |
| F16H 61/00 | (2006.01) |
| F15B 1/027 | (2006.01) |

(52) U.S. Cl.
CPC ........ *F16H 61/0021* (2013.01); *F16H 2312/14* (2013.01); *F16H 2061/0034* (2013.01); *F15B 1/027* (2013.01)
USPC ................ 60/413; 137/536; 137/538; 60/418

(58) Field of Classification Search
USPC ............... 137/538, 119.08, 119.01, 535, 536; 60/413, 417, 418; 251/900
See application file for complete search history.

(56) References Cited

U.S. PATENT DOCUMENTS

| 2,484,102 A | * | 10/1949 | Le Valley ...................... 251/363 |
| 2,644,480 A | * | 7/1953 | Earle et al. .................... 137/469 |
| 3,834,499 A | * | 9/1974 | Candellero et al. ............ 477/73 |
| 4,076,036 A | * | 2/1978 | Taft .......................... 137/118.06 |
| 4,168,721 A | * | 9/1979 | Mueller, Jr. ................. 137/514.7 |
| 4,350,176 A | * | 9/1982 | Lace .............................. 137/242 |
| 4,936,339 A | * | 6/1990 | Bennett ...................... 137/454.6 |
| 5,355,676 A | * | 10/1994 | Inokuchi .......................... 60/413 |
| 6,070,408 A | * | 6/2000 | Clarke et al. ..................... 60/415 |
| 6,698,304 B2 |   | 3/2004 | Gierling et al. |
| 6,715,597 B1 |   | 4/2004 | Buchanan et al. |
| 6,789,658 B2 | * | 9/2004 | Busold et al. .............. 192/103 F |
| 6,827,191 B2 |   | 12/2004 | Kuhstrebe |
| 6,854,269 B2 | * | 2/2005 | Hale ............................... 60/417 |

(Continued)

FOREIGN PATENT DOCUMENTS

| DE | 10125172 A1 | 11/2002 |
| DE | 10134115 A1 | 1/2003 |

(Continued)

*Primary Examiner* — John Rivell
*Assistant Examiner* — Angelisa Hicks

(57) ABSTRACT

A system for providing pressurized hydraulic fluid includes a pump. A bypass valve assembly includes an inlet port in communication with the pump and an outlet port in communication with an accumulator. The pump and the accumulator are both in communication with a hydraulic control system that controls, lubricates, and cools a transmission of a motor vehicle. The bypass valve assembly has a valve moveable between at least a two positions. The bypass valve assembly is operable to bypass the accumulator when the vehicle is first started such that the pump charges the hydraulic control system before charging the accumulator. The accumulator provides pressurized hydraulic fluid to the hydraulic control system after vehicle start.

8 Claims, 3 Drawing Sheets

(56) References Cited

U.S. PATENT DOCUMENTS

| | | |
|---|---|---|
| 6,883,394 B2 | 4/2005 | Koenig et al. |
| 6,941,830 B2 | 9/2005 | Ibamoto et al. |
| 6,957,721 B2 * | 10/2005 | Moser .......................... 187/285 |
| 7,019,411 B2 * | 3/2006 | Satou et al. .................... 290/2 |
| 7,165,950 B2 * | 1/2007 | Fenny et al. .................. 417/270 |
| 7,401,689 B2 | 7/2008 | Hegerath et al. |
| 7,464,617 B2 | 12/2008 | Baldascini et al. |
| 7,464,618 B2 | 12/2008 | Mohlmann et al. |
| 7,472,616 B2 | 1/2009 | Dreher et al. |
| 7,478,572 B2 | 1/2009 | Maten et al. |
| 7,494,193 B2 * | 2/2009 | Wedekind .................... 303/2 |
| 7,591,203 B2 | 9/2009 | Ochi et al. |
| 2003/0226416 A1 | 12/2003 | Umemoto et al. |
| 2005/0067251 A1 | 3/2005 | Braford, Jr. et al. |
| 2005/0107214 A1 | 5/2005 | Koenig |
| 2007/0012038 A1 * | 1/2007 | Bitter .......................... 60/413 |
| 2008/0223683 A1 | 9/2008 | Grethel |
| 2009/0000897 A1 | 1/2009 | Staudinger et al. |

FOREIGN PATENT DOCUMENTS

| | | |
|---|---|---|
| DE | 102005029963 A1 | 2/2007 |
| DE | 102008008454 A1 | 9/2008 |
| DE | 102008058692 A1 | 6/2009 |
| EP | 1400733 A2 | 3/2004 |
| EP | 1433976 A1 | 6/2004 |
| EP | 1589262 A1 | 10/2005 |
| EP | 1767824 A1 | 3/2007 |
| WO | WO2004097265 A1 | 11/2004 |

* cited by examiner

TRANSMISSION HYDRAULIC CONTROL SYSTEM HAVING AN ACCUMULATOR BYPASS VALVE ASSEMBLY

CROSS-REFERENCE TO RELATED APPLICATIONS

This application claims the benefit of U.S. Provisional Application No. 61/287,814, filed on Dec. 18, 2009, which is hereby incorporated in its entirety herein by reference.

FIELD

The invention to a hydraulic control system for a transmission, and more particularly to an electro-hydraulic control system having an engine driven or electronically driven pump, an accumulator bypass valve assembly, and an accumulator.

BACKGROUND

The statements in this section merely provide background information related to the present invention and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine or electric motor of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In certain transmission configurations, actuation of the torque transmitting devices is achieved by selective release of an accumulator charged with hydraulic fluid. The accumulator is charged intermittently by the main pump and the main pump is typically deactivated when not charging the accumulator. However, during a vehicle start when the accumulator is empty, there is a delay in the operation of the hydraulic control system as the pump first charges the accumulator before the accumulator can supply pressurized hydraulic fluid to the hydraulic control system. Therefore, there is room in the art for a system to reduce or eliminate the shifting lag time due to charging the accumulator during a vehicle start.

SUMMARY

An example of a system for providing pressurized hydraulic fluid in a transmission of a motor vehicle is provided. The system includes a pump for providing pressurized hydraulic fluid having an inlet port and an outlet port. A bypass valve assembly includes an inlet port in communication with the outlet port of the pump and an outlet port in communication with an accumulator. The pump and the accumulator are both in communication with a hydraulic control system that controls, lubricates, and cools the transmission of the motor vehicle. The bypass valve assembly has a valve moveable between at least a first position and a second position, wherein the inlet port of the bypass valve assembly is not in communication with the outlet port of the bypass valve assembly when the valve is in the first position and the inlet port of the bypass valve assembly is in communication with the outlet port of the bypass valve assembly when the valve is in the second position. The bypass valve assembly is in the first position when the vehicle is first started such that the pump bypasses charging the accumulator and instead charges the hydraulic control system. The valve moves to the second position once the hydraulic control system is charged or saturated and the pump then charges the accumulator. The accumulator provides pressurized hydraulic fluid to the hydraulic control system. The pump charges the accumulator as needed during operation of the transmission.

In one example of system, the system includes one-way ball check valves to prevent flow back to the pump when the pump is deactivated and to prevent flow to the accumulator until the control system is charged In another example of the system, the valve includes ports and channels that communicate with the inlet port and outlet port of the bypass valve assembly.

In yet another example of the system, the bypass valve assembly includes seals that seal to the valve when the valve is in the first position, thereby cutting off communication between the inlet port and the outlet port.

Further areas of applicability will become apparent from the description provided herein. It should be understood that the description and specific examples are intended for purposes of illustration only and are not intended to limit the scope of the present invention.

DRAWINGS

The drawings described herein are for illustration purposes only and are not intended to limit the scope of the present invention in any way.

DETAILED DESCRIPTION

The following description is merely exemplary in nature and is not intended to limit the present invention, application, or uses.

Figure 1:
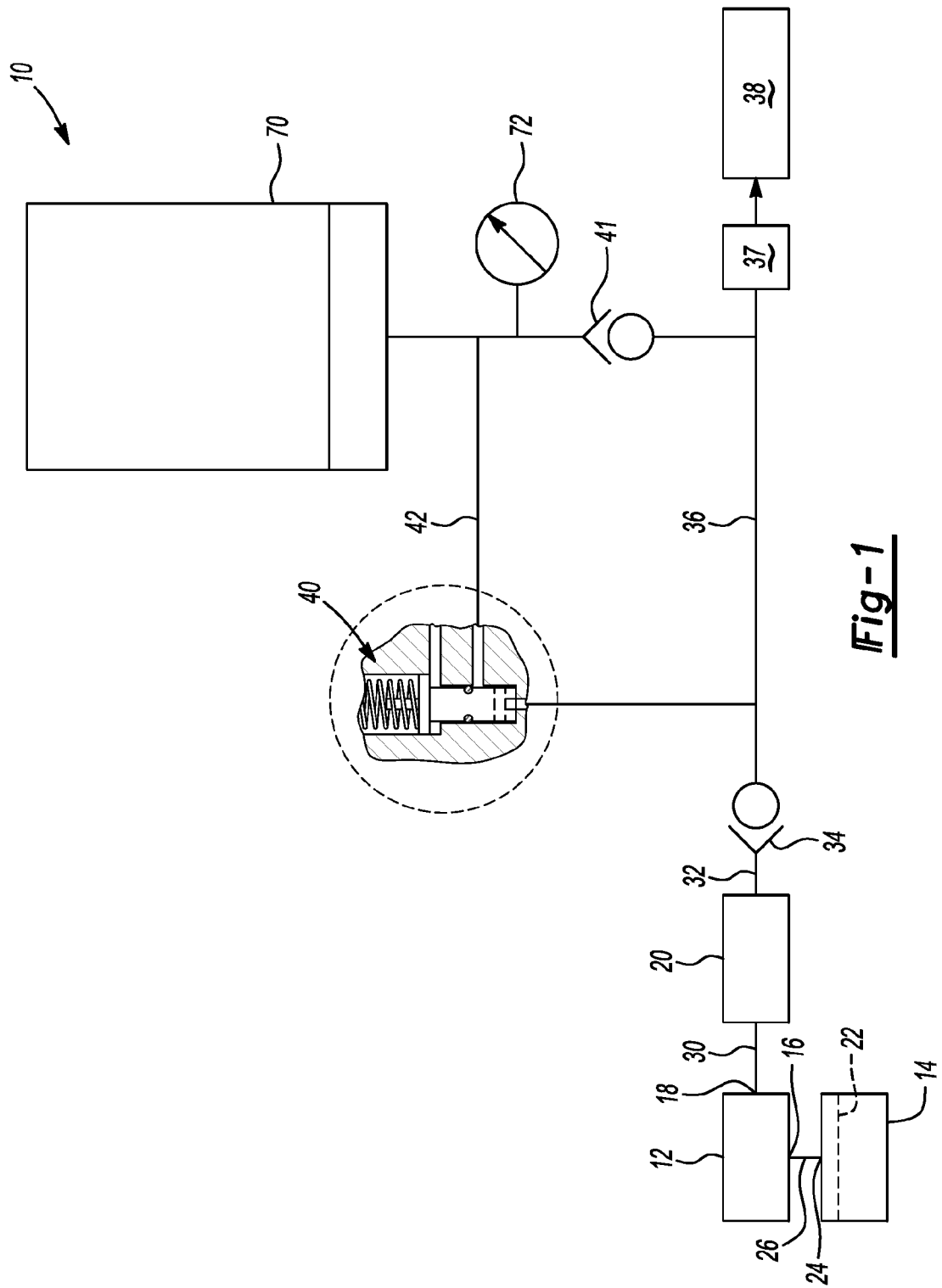
FIG. 1 is a schematic diagram of subsystem of a hydraulic control system operable to provide pressurized hydraulic fluid flow to the hydraulic control system according to the principles of the present invention.

Referring to FIG. 1, a subsystem of a hydraulic control system for a transmission of a motor vehicle is generally indicated by reference number 10. The subsystem 10 operates as a source of pressurized hydraulic fluid for the hydraulic control system and includes a pump 12 in fluid communication with a sump 14. The pump 12 may be directly driven by an engine in the motor vehicle or by an electric motor or other prime mover. The pump 12 includes an inlet port 16 and an outlet port 18. The inlet port 16 communicates with the sump 14 and the outlet port 18 communicates with a filter 20. The pump 12 may be of various types, for example, a gear pump, a vane pump, a gerotor pump, or any other positive displacement pump. The sump 14 is a fluid reservoir, typically located at a bottom of the transmission, which is operable to store a hydraulic fluid 22. The sump 14 includes an outlet port 24.

The hydraulic fluid 22 is forced from the sump 14 by the pump 12 and is communicated from the outlet port 24 of the sump 14 to the inlet port 16 of the pump 12 via a suction line 26. The outlet port 18 of the pump 12 communicates a flow of pressurized hydraulic fluid 22 to an intermediate line 30. The intermediate line 30 is in communication with the filter 20.

The filter 20 screens the flow of hydraulic fluid 22 and communicates with a second intermediate line 32. The second intermediate line 32 communicates with a one-way ball check valve 34. The check valve 34 communicates with a main supply line 36. The check valve 34 allows fluid communication in one direction only. For example, the check valve 34 allows fluid communication from the second intermediate line 32 to the main supply line 36 and prevents fluid communication from the main supply line 36 to the second intermediate line 32.

The main supply line 36 is in communication with a control device 37 which communicates with the various other subsystems of the hydraulic control system, indicated by reference number 38. The various other subsystems of the hydraulic control system 38 may include, for example, torque transmitting device control subsystems, lubrication regulation subsystems, compensator subsystems, torque converter control subsystems, cooling subsystems, etc. The control device 37 controls the flow of the hydraulic fluid to the hydraulic control system 38. The control device 37 may be, for example, an on/off solenoid. The main supply line 36 also is in communication with a bypass valve assembly 40 and a second one-way ball check valve 41.

Figure 1A:
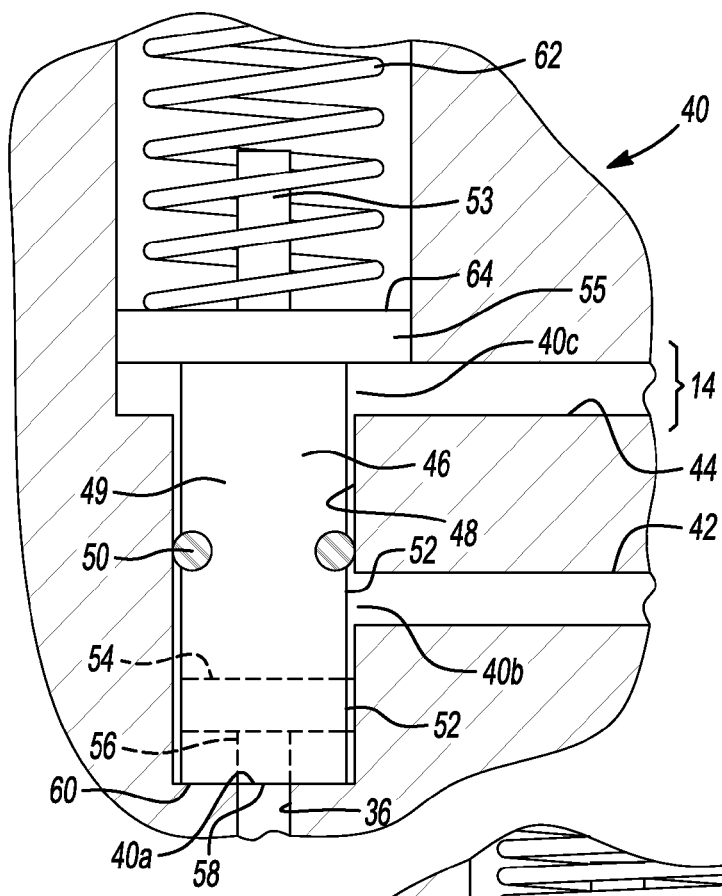
FIG. 1A is an enlarged view of a portion of the subsystem of FIG. 1 in a first mode of operation.
Figure 1B:
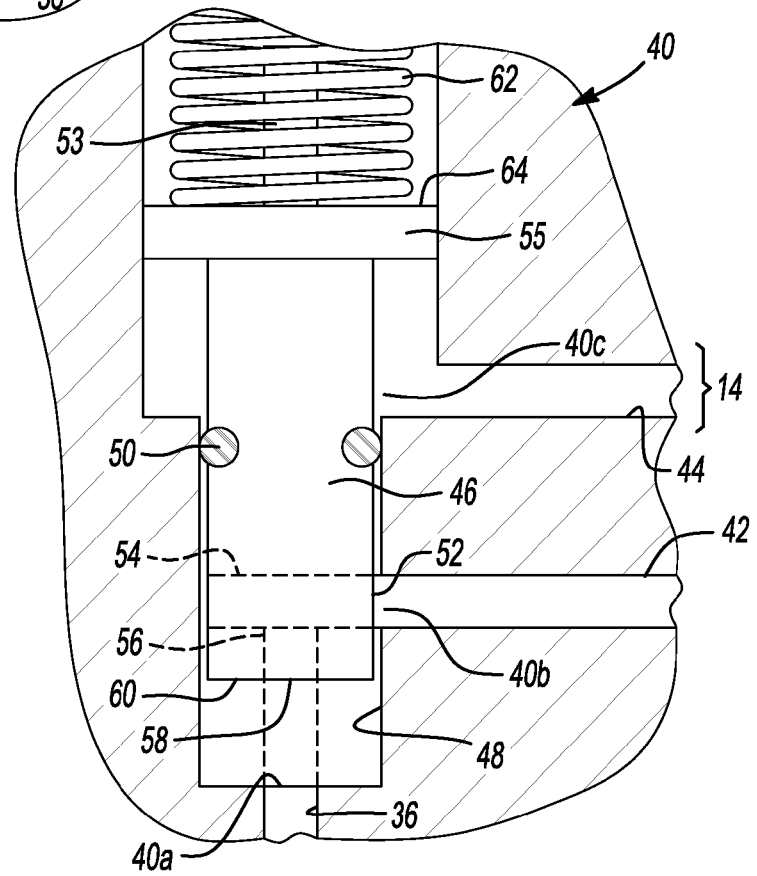
FIG. 1B is an enlarged view of the portion of the subsystem of FIG. 1 and FIG. 1A in a second mode of operation.

The bypass valve assembly 40 is operable to allow selective fluid communication between the main supply line 36 and an accumulator feed line 42. Turning to FIGS. 1A and 1B, the bypass valve assembly 40 includes an inlet port 40A, an outlet port 40B, and an exhaust port 40C. The inlet port 40A is in fluid communication with the main supply line 36. The outlet port 40B is in fluid communication with the accumulator feed line 42. The exhaust port 40C is in fluid communication with an exhaust line 44 that communicates with the sump 14.

The bypass valve assembly 40 further includes a valve or piston 46 slidably disposed in a bore 48. The valve 46 is sealed to the bore 48 via at least one ring seal 50. The valve 46 includes a first valve land 49. The first valve land 49 is preferably cylindrical in shape and is sized to fit within the bore 48. The valve 46 includes at least one side port 52 in the first valve land 49 that communicates with a transverse fluid channel 54 that is disposed perpendicular to the axis of the valve 46. The transverse fluid channel 54 communicates with an axial fluid channel 56 which communicates with an end port 58. The end port 58 is located on a distal end 60 of the valve 46. The end port 58 is in communication with the inlet port 40A of the bypass valve assembly 40.

The valve 46 is moveable between at least two positions. In a first position, or de-stroked position, shown in FIG. 1A, the outlet port 40B is cut off by the valve 46. In a second position or stroked position, shown in FIG. 1B, the outlet port 40B is in fluid communication with the side port 52 of the valve 46. The valve 46 is biased to the de-stroked position by a biasing member 62. The biasing member 62 is supported by a support column 53 coupled to a second valve land 55 attached to an end of the first valve land 49. The biasing member 62 acts on a second distal end 64 of the valve 46 opposite the distal end 60. The valve 46 is moved to the stroked position by hydraulic fluid 22 acting on the end 60 of the valve 46 against the bias of the biasing member 62, as will be described below. The bypass valve assembly 40 is set to a minimum system hydraulic fluid pressure.

Returning to FIG. 1, the second one-way ball check valve 41 communicates with the accumulator feed line 42. The check valve 41 allows fluid communication in one direction only. For example, the check valve 1 allows fluid communication from the accumulator feed line 42 to the main supply line 36 and prevents fluid communication from the main supply line 36 to the accumulator feed line 42.

The accumulator feed line 42 is in communication with an accumulator 70 and a pressure sensor 72. The accumulator 70 is an energy storage device in which the non-compressible hydraulic fluid 22 is held under pressure by an external source. In the example provided, the accumulator 70 is a spring type or gas filled type accumulator having a spring or compressible gas that provides a compressive force on the hydraulic fluid 22 within the accumulator 70. However, it should be appreciated that the accumulator 70 may be of other types without departing from the scope of the present invention. Accordingly, the accumulator 70 is operable to supply pressurized hydraulic fluid 22 to the main supply line 36 through the second check valve 41. However, upon discharge of the accumulator 70, the check valve 34 prevents the pressurized hydraulic fluid 22 from returning to the pump 12. The accumulator 70, when charged, effectively replaces the pump 12 as the source of pressurized hydraulic fluid 22, thereby eliminating the need for the pump 12 to run continuously. The main pressure sensor 72 reads the pressure of the hydraulic fluid 22 within the accumulator feed line 42 in real time and provides this data to a transmission control module (not shown).

The components of the hydraulic control subsystem 10 are connected via a plurality of fluid communication lines, described above. It should be appreciated that the fluid communication lines may be integrated in a valve body or formed from separate tubing or piping without departing from the scope of the present invention. In addition, the fluid communication lines may have any cross sectional shape and may include additional or fewer bends, turns, and branches than illustrated without departing from the scope of the present invention.

With combined reference to FIGS. 1, 1A, 1B, and 2, the operation of the hydraulic control subsystem 10 will now be described. The pump 12 is used primarily for charging the accumulator 70. Actuation of torque transmitting devices, lubrication, and cooling within the hydraulic control system 38 is achieved via discharge of the accumulator 70. Opening of the control device 37 allows the pump 12 and accumulator 70 to provide a flow of pressurized hydraulic fluid 22 to the hydraulic control system 38. Closing of the control device 37 allows the pump 12 to charge the accumulator 70. The subsystem 10 operates to charge the accumulator 70 using the pump 12 and reduce the amount of losses due to the pump 12 operating continuously by allowing the pump 12 to be deactivated while the accumulator 70 is providing a flow of pressurized hydraulic fluid 22 to the hydraulic control system 38.

During a startup condition wherein the main supply line 36, the hydraulic control system 38, and the accumulator 70 are not pressurized with hydraulic fluid 22, the pump 12 is commanded to operate and a flow of pressurized hydraulic fluid 22 is drawn from the sump 14, through the pump 12, through the filter and the check valve 34 to the main supply line 36. Initially, the pressure of the hydraulic fluid 22 within the main supply line 36 is insufficient to overcome the bias of the biasing member 62 of the bypass valve assembly 40. Accordingly, the valve 46 remains de-stroked, thereby cutting off the accumulator 70 from the main supply line 36. Therefore, the flow of pressurized hydraulic fluid 22 from the pump 12 is directed directly to the hydraulic control system 38, providing system pressure to the hydraulic control system 38 and allowing the hydraulic control system 38 to operate effectively immediately after vehicle start. As the hydraulic control system 38 becomes saturated, the pressure within the main supply line 36 increases. The increasing pressure within the main supply line 36 creates a force on the distal end 60 of the valve 46 and the valve 46 strokes against the biasing member 62 to the stroked position. Accordingly, the hydraulic fluid 22 communicates through the accumulator feed line 42 and charges the accumulator 70.

During normal operating conditions, the main pressure sensor 72 is used to monitor the pressure of the hydraulic fluid 22 within the accumulator 70. If the accumulator 70 is not fully charged or drops below a threshold value, the transmission control module commands the pump 12 to operate. Closing the solenoid 37 prevents a flow of hydraulic fluid to the hydraulic control system 38, but allows the pump 12 to charge the accumulator 70. A flow of pressurized hydraulic fluid 22 communicates through the check valve 34 to the main supply line 36, through the bypass valve assembly 40 and the accumulator feed line 42 to the accumulator 70. Once the main pressure sensor 72 senses a pressure of the hydraulic fluid 22 within the accumulator 70 that is indicative that the accumulator 70 is fully charged, the transmission control module commands the pump 12 to cease operating, and the accumulator 70 is discharged as needed to provide pressurized hydraulic fluid 22 through check valve 41 to the main supply line 36. Alternatively, the pump 12 may remain operational and provide a flow of pressurized hydraulic fluid 22 to the main supply line 36 in conjunction with the discharge of the accumulator 70. Control of the accumulator 70 may be accomplished using a control device, such as an on/off solenoid, located downstream of the accumulator within the hydraulic control system 38.

Figure 2:
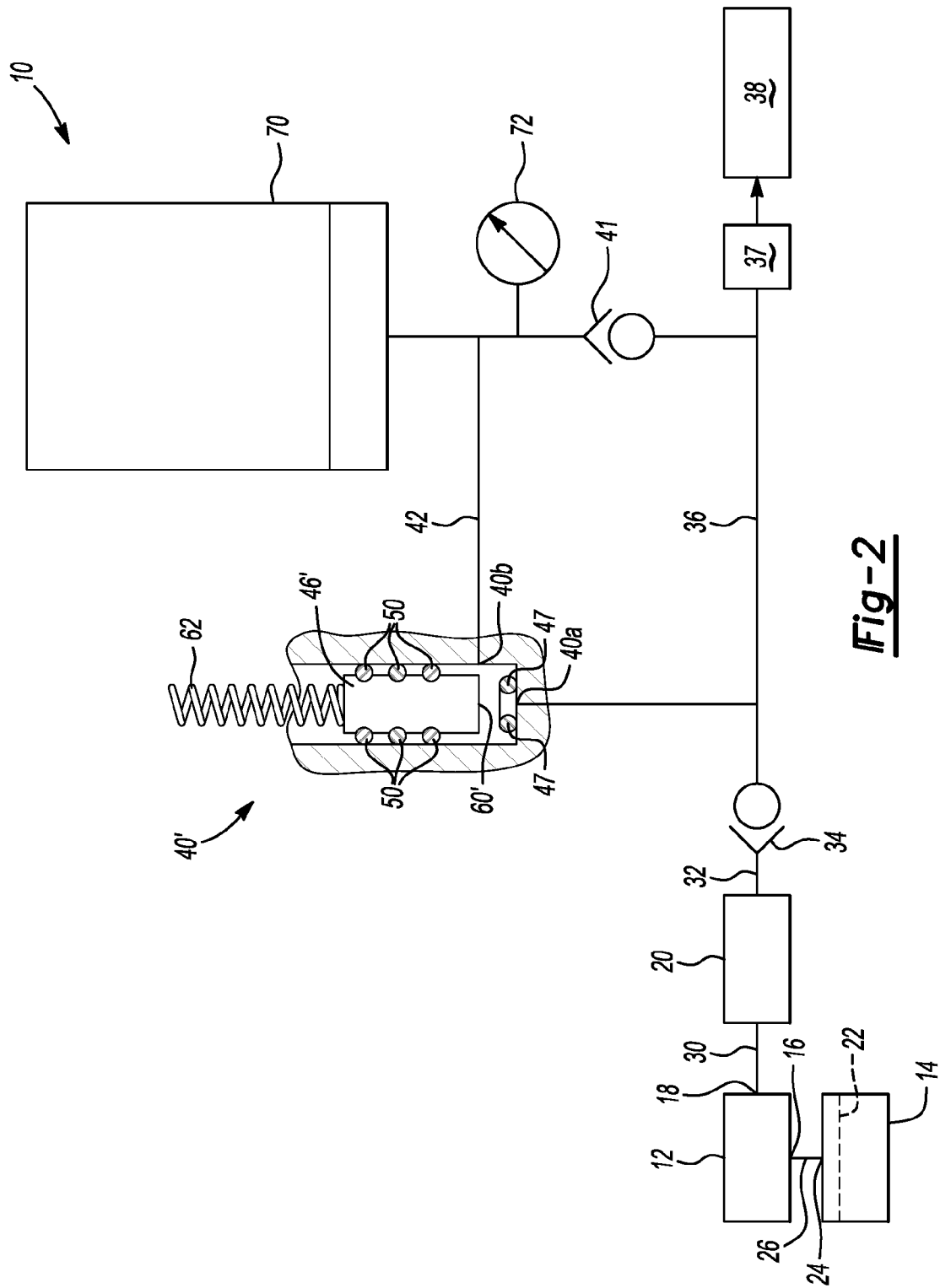
FIG. 2 is a schematic diagram of another example of a subsystem of a hydraulic control system operable to provide pressurized hydraulic fluid flow to the hydraulic control system according to the principles of the present invention.

Turning to FIG. 2, an alternate bypass valve assembly is generally indicated by reference number 40'. The bypass valve assembly 40' is similar to the bypass valve assembly 40 described above and therefore like components are indicated by like reference numbers. However, the bypass valve assembly 40' includes a valve 46'. The valve 46' is similar to the valve 46 previously described, however, the valve 46' does not include ports or channels. Instead, the bypass valve assembly 40' includes a ring seal 47 that operates to seal the inlet port 40A from the outlet port 40B when the valve 46' is de-stroked. The ring seal 47 is disposed around the inlet port 40A such that the biasing force of the biasing member 62 seals a distal end 60' of the valve 46' to the seal 47, thereby cutting off the inlet port 40A from the outlet port 40B. The bypass valve assembly 40' also includes a plurality of guides 50. The bypass valve assembly 40' operates in a manner similar to the bypass valve assembly 40 described above.

The subsystem 10 of the present invention reduces hydraulic control system 38 feed time when the accumulator 70 is discharged, minimizes accumulator pre-charge losses, and may be designed to function as a reserve spring accumulator. The net result is a reduction in any shift time delay associated with first shifts after vehicle start.

The description of the invention is merely exemplary in nature and variations that do not depart from the gist of the invention are intended to be within the scope of the invention. Such variations are not to be regarded as a departure from the spirit and scope of the invention.

We claim the following:

1. A system for providing pressurized hydraulic fluid to a hydraulic control in a transmission of a motor vehicle, the system comprising:
   a pump for providing the pressurized hydraulic fluid;
   a control device for selectively communicating the pressurized hydraulic fluid to the hydraulic control;
   a first one-way device configured to communicate pressurized hydraulic fluid flow from the pump and to prevent pressurized hydraulic fluid flow to the pump;
   a bypass valve assembly having a bore that defines an inlet port in communication with the first one-way device and an outlet port, the bypass valve assembly having a ring seal disposed circumferentially around the inlet port and a member moveable between at least a first position and a second position, wherein the member is sealed to the bore by a second ring seal when in both the first and second positions and the member includes a first end surface that contacts the ring seal when the member is in the first position to hydraulically isolate the inlet port of the bypass valve assembly from the outlet port of the bypass valve assembly and wherein the first end surface does not contact the ring seal when the member is in the second position to allow the inlet port of the bypass valve assembly to communicate with the outlet port of the bypass valve assembly, and wherein the member is biased to the first position by a force acting on the member due to a biasing member;
   an accumulator in communication with the outlet port of the bypass valve assembly;
   a second one-way device configured to communicate pressurized hydraulic fluid flow from the accumulator and to prevent pressurized hydraulic fluid flow to the accumulator;
   wherein the accumulator is charged when the control device is closed and the member is moved to the second position from the first position when a force acting on the first end surface of the member due to the pressurized hydraulic fluid at the inlet port of the bypass valve assembly exceeds the force acting on the member due to the biasing member.

2. The system of claim 1 wherein the second port is oriented at ninety degrees with respect to the first port.

3. The system of claim 1 wherein the control device is an electrically activated solenoid.

4. The system of claim 1 wherein the first and second one-way devices are ball check valves.

5. The system of claim 1 further comprising a pressure sensor in communication with the accumulator, wherein the control device is closed when the pressure of the hydraulic fluid within the accumulator is less than a threshold pressure.

6. The system of claim 1 wherein the first end surface of the piston is planar.

7. The system of claim 1 wherein the first end surface of the piston is flat and uninterrupted to seal against the ring seal to prevent hydraulic fluid from communicating through the ring seal.

8. A system for providing pressurized hydraulic fluid to a hydraulic control in a transmission of a motor vehicle, the system comprising:
   a pump for providing the pressurized hydraulic fluid;
   a control device in downstream fluid communication with the pump for selectively communicating the pressurized hydraulic fluid to the hydraulic control;
   a first one-way device in downstream fluid communication with the pump and configured to communicate pressurized hydraulic fluid flow from the pump and to prevent pressurized hydraulic fluid flow to the pump;
   a bypass valve assembly having an inlet port in communication with the first one-way device and an outlet port, the bypass valve assembly having a piston slidably disposed and sealed to a bore, the piston having a first end and a second end, wherein the first end is in contact with a biasing member and the second end is in communication with the inlet port, wherein the bypass valve assembly further includes a ring seal disposed around the inlet port, wherein the piston is moveable between at least a first position and a second position and is sealed to the bore by a second ring seal when in both the first and second positions, wherein the inlet port of the bypass valve assembly is not in communication with the outlet port of the bypass valve assembly when the piston is in the first position and sealed against the ring seal and the inlet port of the bypass valve assembly is in communication with the outlet port of the bypass valve assembly when the piston is in the second position and not in contact with the ring seal;

an accumulator in communication with the outlet port of the bypass valve assembly;

a second one-way device configured to communicate pressurized hydraulic fluid flow from the accumulator and to prevent pressurized hydraulic fluid flow to the accumulator;

wherein the accumulator is charged when the control device is closed and the piston is moved to the second position from the first position when a force acting on the piston due to the pressurized hydraulic fluid at the inlet port of the bypass valve assembly exceeds a force acting on the piston due to the biasing member.

\* \* \* \* \*